(12) United States Patent
Gorek et al.

(10) Patent No.: US 8,786,288 B2
(45) Date of Patent: Jul. 22, 2014

(54) CONCENTRIC BUTTONS OF DIFFERENT SIZES FOR IMAGING AND STANDOFF CORRECTION

(75) Inventors: Matthias Gorek, Lower Saxony (DE); Gregory B. Itskovich, Houston, TX (US); Alexandre N. Bespalov, Spring, TX (US); Frank Daschner, Kalübbe (DE); Reinhard Knöchel, Elmshorn (DE); Assol Kavtorina, legal representative, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 351 days.

(21) Appl. No.: 13/212,624

(22) Filed: Aug. 18, 2011

(65) Prior Publication Data

US 2012/0209527 A1    Aug. 16, 2012

Related U.S. Application Data

(63) Continuation-in-part of application No. 13/046,096, filed on Mar. 11, 2011, now Pat. No. 8,115,490, which is a continuation of application No. 12/178,590, filed on Jul. 23, 2008, now Pat. No. 7,928,733.

(51) Int. Cl.
*G01V 3/24* (2006.01)
*G06N 3/02* (2006.01)

(52) U.S. Cl.
CPC .................................... *G01V 3/24* (2013.01)
USPC ................................ 324/351; 324/352; 702/7

(58) Field of Classification Search
CPC ............. G01V 3/24; G06N 3/02; G06K 9/00
See application file for complete search history.

(56) References Cited

U.S. PATENT DOCUMENTS

| | | | |
|---|---|---|---|
| 5,420,402 A * | 5/1995 | Bridges et al. | 219/772 |
| 6,359,438 B1 | 3/2002 | Bittar | |
| 6,600,321 B2 | 7/2003 | Evans | |
| 6,601,053 B1 * | 7/2003 | Schaffer et al. | 706/26 |
| 6,714,014 B2 | 3/2004 | Evans et al. | |
| 7,046,010 B2 | 5/2006 | Hu et al. | |
| 7,076,370 B1 * | 7/2006 | Freedman et al. | 702/6 |
| 7,250,768 B2 | 7/2007 | Ritter et al. | |
| 7,256,582 B2 | 8/2007 | Gorek et al. | |

(Continued)

OTHER PUBLICATIONS

Bittar, et al. "A Multiple-Depth-of-Investigation Electromagnetic Wave Resistivity Sensors: Theory, Experiment, and Field Test Results". SPE 22705. Sep. 1993. pp. 171-176.

*Primary Examiner* — Arleen M Vazquez
*Assistant Examiner* — Courtney McDonnough
(74) *Attorney, Agent, or Firm* — Cantor Colburn LLP

(57) ABSTRACT

Disclosed is a method of estimating a property of an earth formation penetrated by a borehole. The method includes conveying a carrier through the borehole and performing a plurality of electrical measurements on the formation using a sensor disposed at the carrier and having a plurality of electrodes disposed in a concentric arrangement wherein a standoff distance between the sensor and a wall of the borehole has an influence on each electrical measurement in the plurality of electrical measurements. The method further includes determining an impedance for each electrical measurement in the plurality of electrical measurements and inputting the determined impedances into an artificial neural network implemented by a processor. The artificial neural network outputs the property wherein the outputted property compensates for the influence of sensor standoff distance on each electrical measurement in the plurality of electrical measurements.

23 Claims, 20 Drawing Sheets

(56) References Cited

U.S. PATENT DOCUMENTS

| | | |
|---|---|---|
| 7,928,733 B2 | 4/2011 | Gorek |
| 2005/0001624 A1* | 1/2005 | Ritter et al. .................. 324/374 |
| 2005/0067190 A1* | 3/2005 | Tabanou et al. ................. 175/50 |
| 2006/0238202 A1* | 10/2006 | Gorek et al. .................. 324/373 |
| 2010/0019771 A1* | 1/2010 | Gold et al. ..................... 324/355 |
| 2010/0211536 A1* | 8/2010 | Al-Fattah ....................... 706/21 |

* cited by examiner

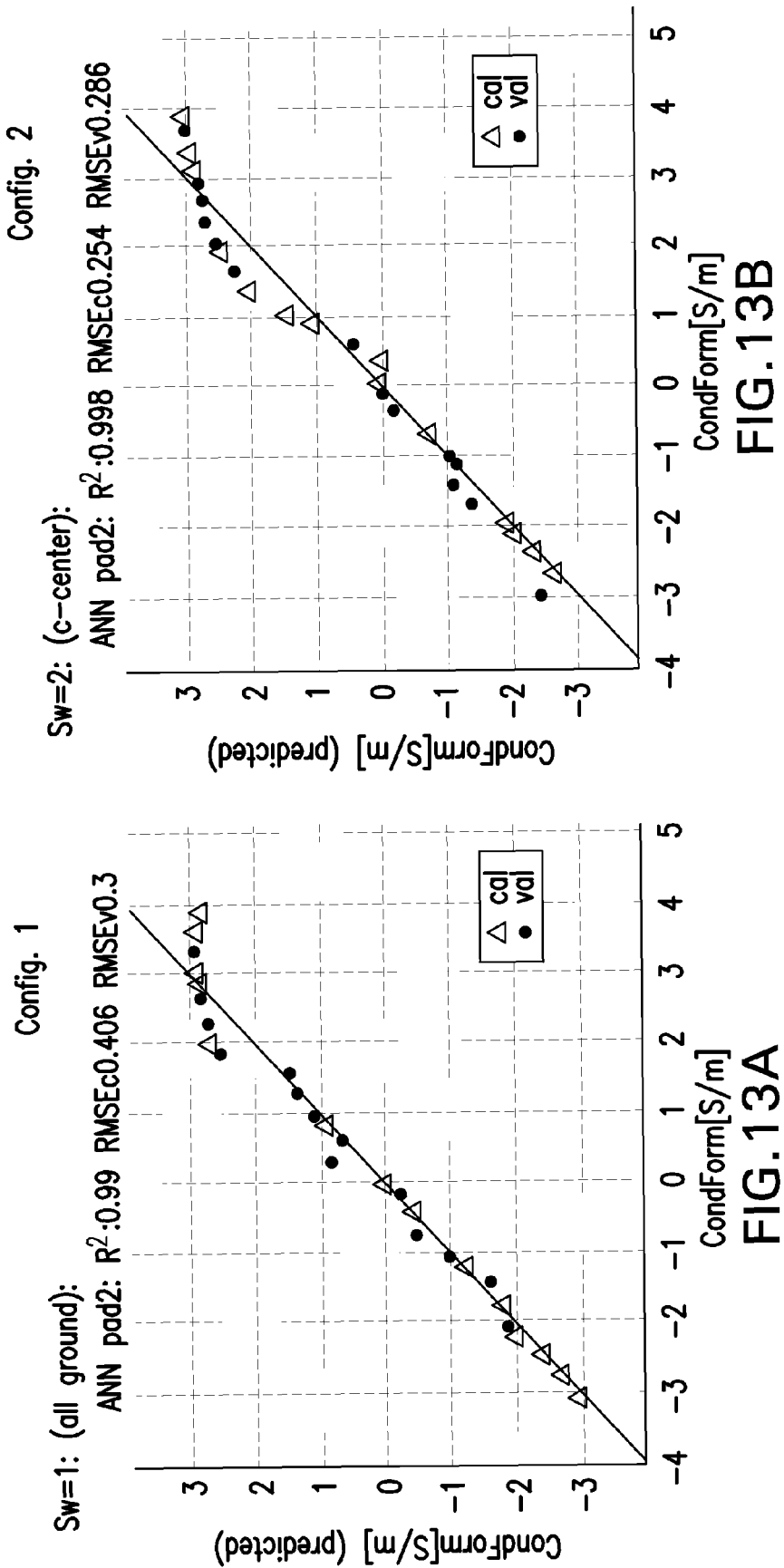

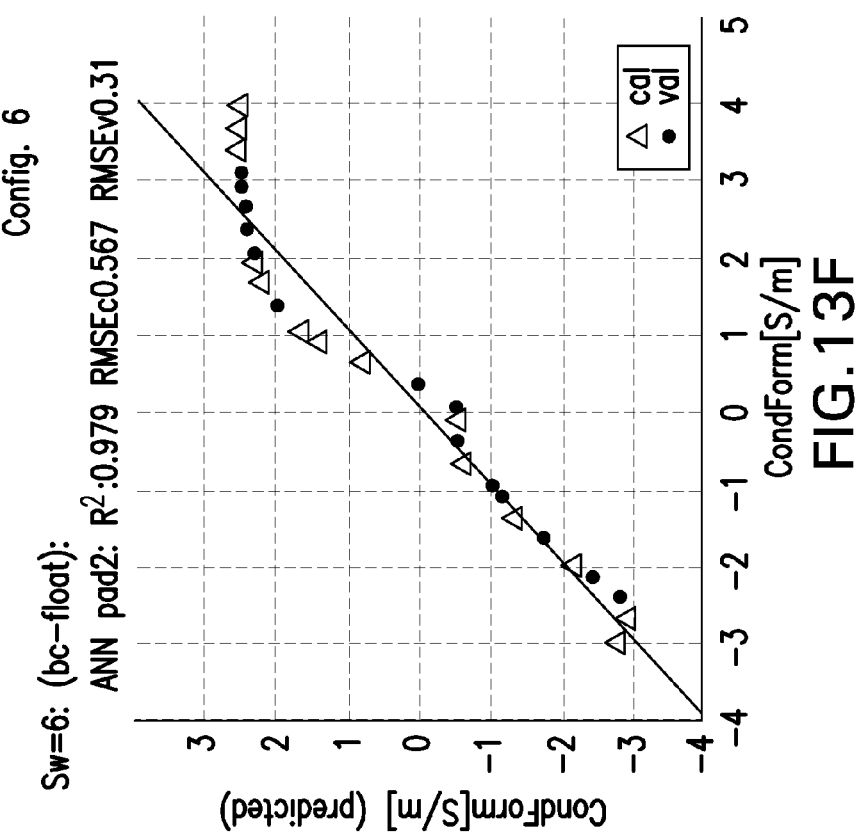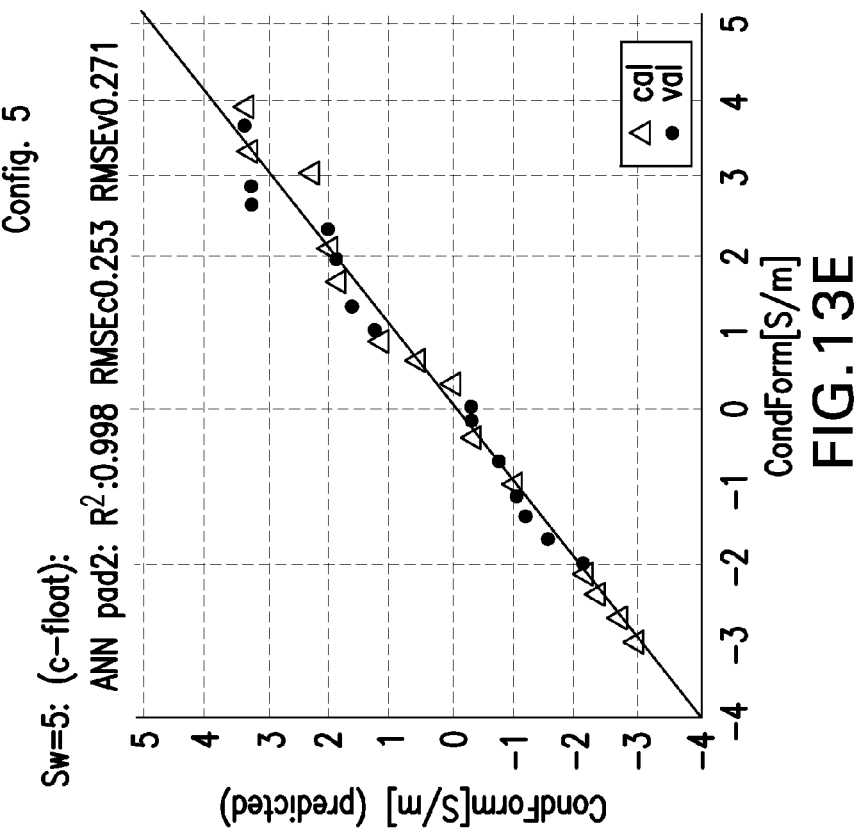

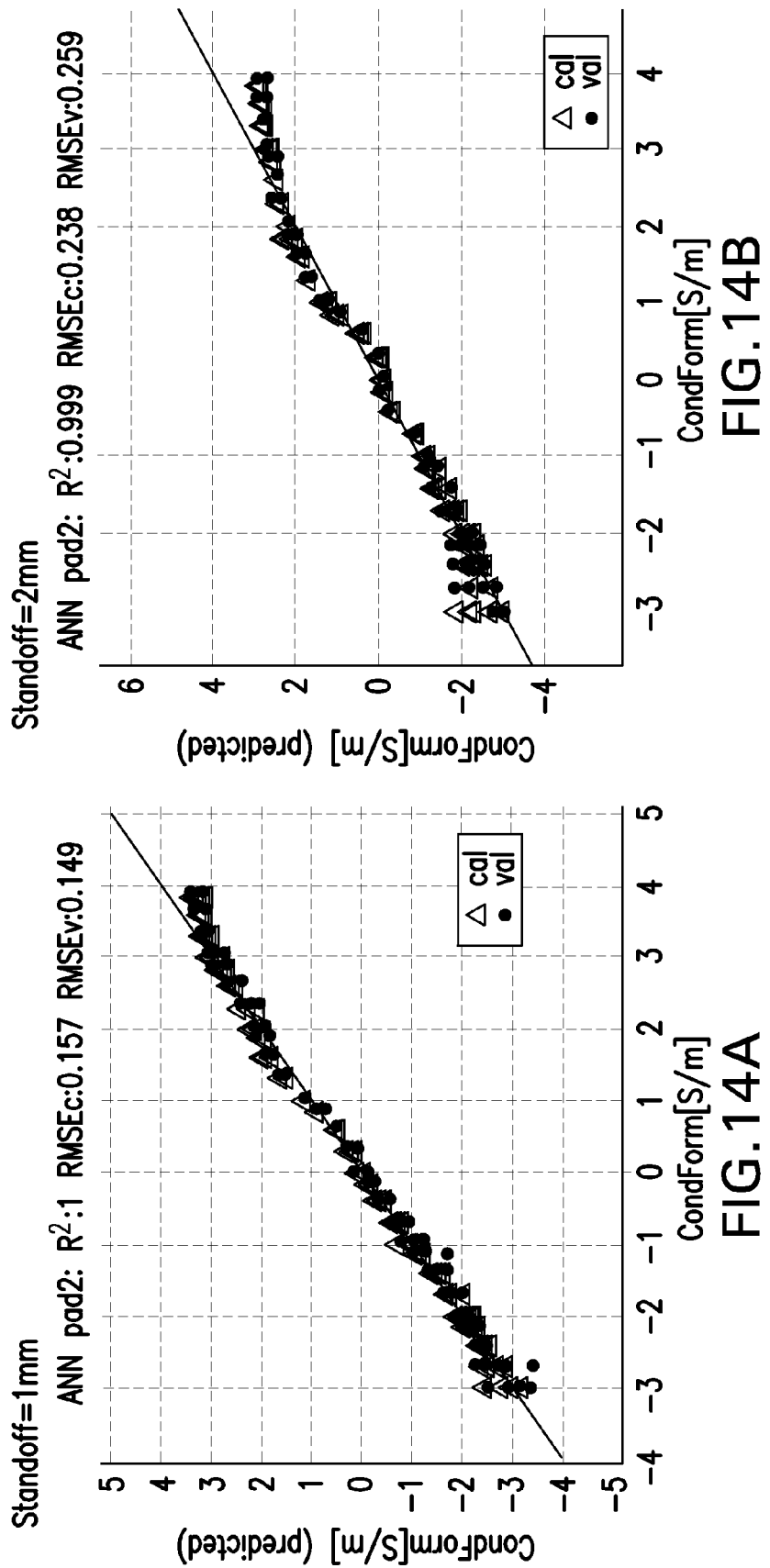

US 8,786,288 B2

CONCENTRIC BUTTONS OF DIFFERENT SIZES FOR IMAGING AND STANDOFF CORRECTION

CROSS-REFERENCE TO RELATED APPLICATION

This is a continuation in part application of U.S. patent application Ser. No. 13/046,096 filed Mar. 11, 2011 which is a continuation application of U.S. patent application Ser. No. 12/178,590 filed Jul. 23, 2008, the entire disclosure of which is incorporated herein by reference.

BACKGROUND OF THE INVENTION

1. Field of the Invention

The invention disclosed herein relates to imaging of subsurface materials and, in particular, to embodiments of electrodes useful for resistivity imaging.

2. Description of the Related Art

Drilling apparatus used for geophysical exploration often include sensors for collecting information about ambient subsurface materials. Sensors may include ones such as those used for resistivity imaging. However, certain problems arise in the use of sensors in a drill string. For example, conventional corrections are performed with calipers and other devices measuring the distance (mechanical, acoustic etc.). The main problem here is the different position of resistivity sensor and caliper, which makes the correction procedure doubtful if vibration occurs.

Therefore, what is needed is a design which offers accurate measurements of standoff at the same position as the resistivity measurements when performing measurement while drilling.

BRIEF SUMMARY OF THE INVENTION

Disclosed is a method of estimating a property of an earth formation penetrated by a borehole. The method includes: disposing into the borehole a sensor having a plurality of return electrodes and at least one transmitter electrode disposed in a concentric arrangement; injecting a first current of a first frequency into the formation by applying an alternating current voltage between first selected ones of the plurality of return electrodes and the at least one transmitter electrode; injecting a second current of a second frequency into the formation by applying an alternating current voltage between second selected ones of the plurality of return electrodes and the at least one transmitter electrode; measuring effective impedance for each of the currents; and estimating the property using the measurements of the effective impedance for each of the currents; wherein the estimating compensates for an influence of standoff distances of the sensor on the measurements.

Also disclosed is a system for estimating a property of an earth formation penetrated by a borehole, the system includes: a sensor configured to be disposed into the borehole, the sensor having a plurality of return electrodes and at least one transmitter electrode disposed in a concentric arrangement; and a processor coupled to the sensor, the processor being configured to execute instructions that implement a method, the method includes: injecting a first current, $I_1$, of a first frequency, $f_1$, into the formation by applying an alternating current (AC) voltage between first selected ones of the plurality of return electrodes and the at least one transmitter electrode; injecting a second current, $I_2$, of a second frequency, $f_2$, into the formation by applying an alternating current (AC) voltage between second selected ones of the plurality of return electrodes and the at least one transmitter electrode; measuring effective impedance, $Z_e$, for each of the currents; estimating the property using the measurements of the effective impedance, $Z_e$, for each of the currents; wherein the estimating compensates for an influence of standoff distances of the sensor on the measurements.

Further disclosed is a non-transitory computer readable medium comprising computer executable instructions for estimating a property of an earth formation penetrated by a borehole using a sensor disposed in the borehole and comprising a plurality of return electrodes and at least one transmitter electrode disposed in a concentric arrangement by implementing a method that includes: injecting a first current, $I_1$, of a first frequency, $f_1$, into the formation by applying an alternating current (AC) voltage between first selected ones of the plurality of return electrodes and the at least one transmitter electrode; injecting a second current, $I_2$, of a second frequency, $f_2$, into the formation by applying an alternating current (AC) voltage between second selected ones of the plurality of return electrodes and the at least one transmitter electrode; measuring effective impedance, $Z_e$, for each of the currents; estimating the property using the measurements of the effective impedance, $Z_e$, for each of the currents; wherein the estimating compensates for an influence of standoff distances of the sensor on the measurements.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Disclosed are techniques for using a sensor having a plurality of electrodes arranged in a concentric manner. The techniques provide for collection of data in challenging environments, such as downhole environments that include oil-based-mud. For a better appreciation of the teachings herein, and a context of the invention, consider the following aspects provided with regard to FIGS. 1 and 2.

Figure 1:
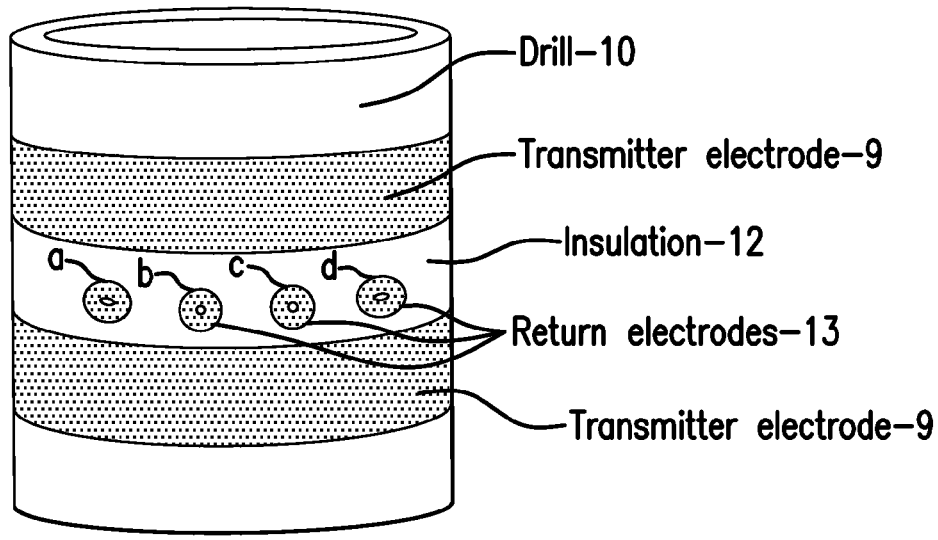
FIG. 1 depicts a sensor having a circumferential distribution of return electrodes along a drill.
Figure 2:
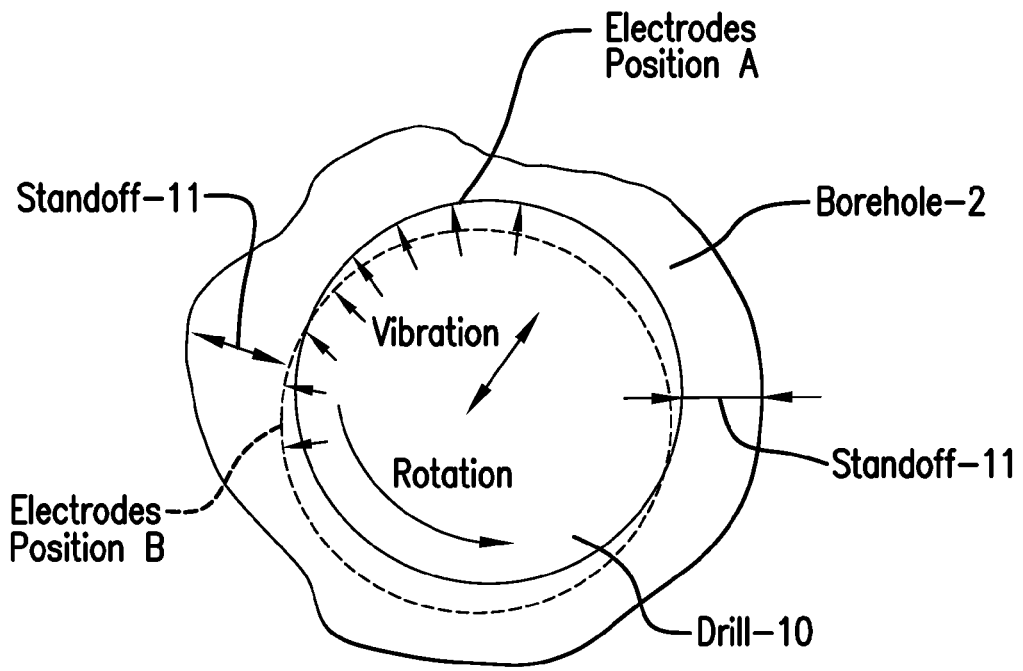
FIG. 2 depicts effects of vibration and rotation of the drill on positioning of the sensor shown in FIG. 1.

FIG. 1 illustrates an arrangement of a sensor with four button electrodes (also referred to as "return electrodes 13"). The return electrodes 13 may be used for a variety of measurements, including those assessing a standoff distance, or simply "standoff 11." Standoff 11 as discussed herein is a distance from an outer surface of a drill 10 (or other such equipment) to a wall of a borehole 2. As shown in FIG. 2, standoff 11 can vary as the borehole 2 typically does not include regular surfaces.

The return electrodes 5 depicted are in four related yet slightly different locations (shown as sensor electrodes "a," "b," "c," and "d"). The use of such sensor electrodes provides for certain advantages when performing measurements and evaluating results. However, due to different positioning of each return electrode 13 on the drill 10, each return electrode 13 measures a property of the borehole 2 at a different position. Therefore, assessment of standoff 11 with one return electrode 13 will not be based on the same information as used by another return electrode 13.

Using such an arrangement of return electrodes 13, it is not possible to uniformly apply the standoff correction. More specifically, measurement values have to be stored and an algorithm has to be applied. Usually, this takes place after one complete rotation. Further, and by way of example, due to vibration (frequency could be some Hz) the different electrodes have different distances by passing the same position. In this case, the correction applied for this position later would be wrong. This problem is more or less the same like for FIG. 3.

Figure 3:
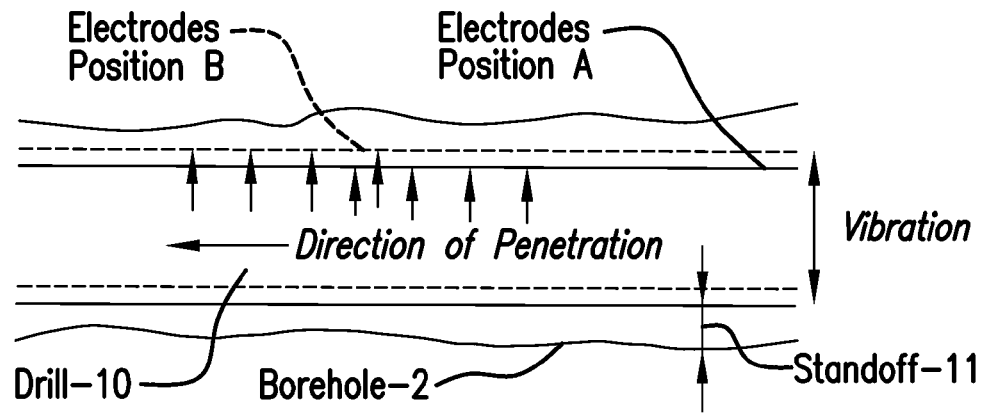
FIG. 3 depicts a sensor having an axial distribution of return electrodes along a drill.

Another orientation, such as one shown in FIG. 3, where the buttons (i.e., return electrodes 13) may be positioned in vertical direction along the drill string 10, is also problematic. In this embodiment, problems arise because the time delay depends on the rate of penetration and is therefore larger. Variation in standoff 11 arises due to vibration of the drill 10 and irregular shape of the borehole 2, and is further complicated by a requirement to consider a rate of penetration. Because of vibration and longer time delay, it is not very likely that one sensor electrode will monitor the same location as another sensor electrode. Depending on distances between each of the sensor electrodes, the time delay may be long enough that the borehole shape may even slightly change.

Figure 4:
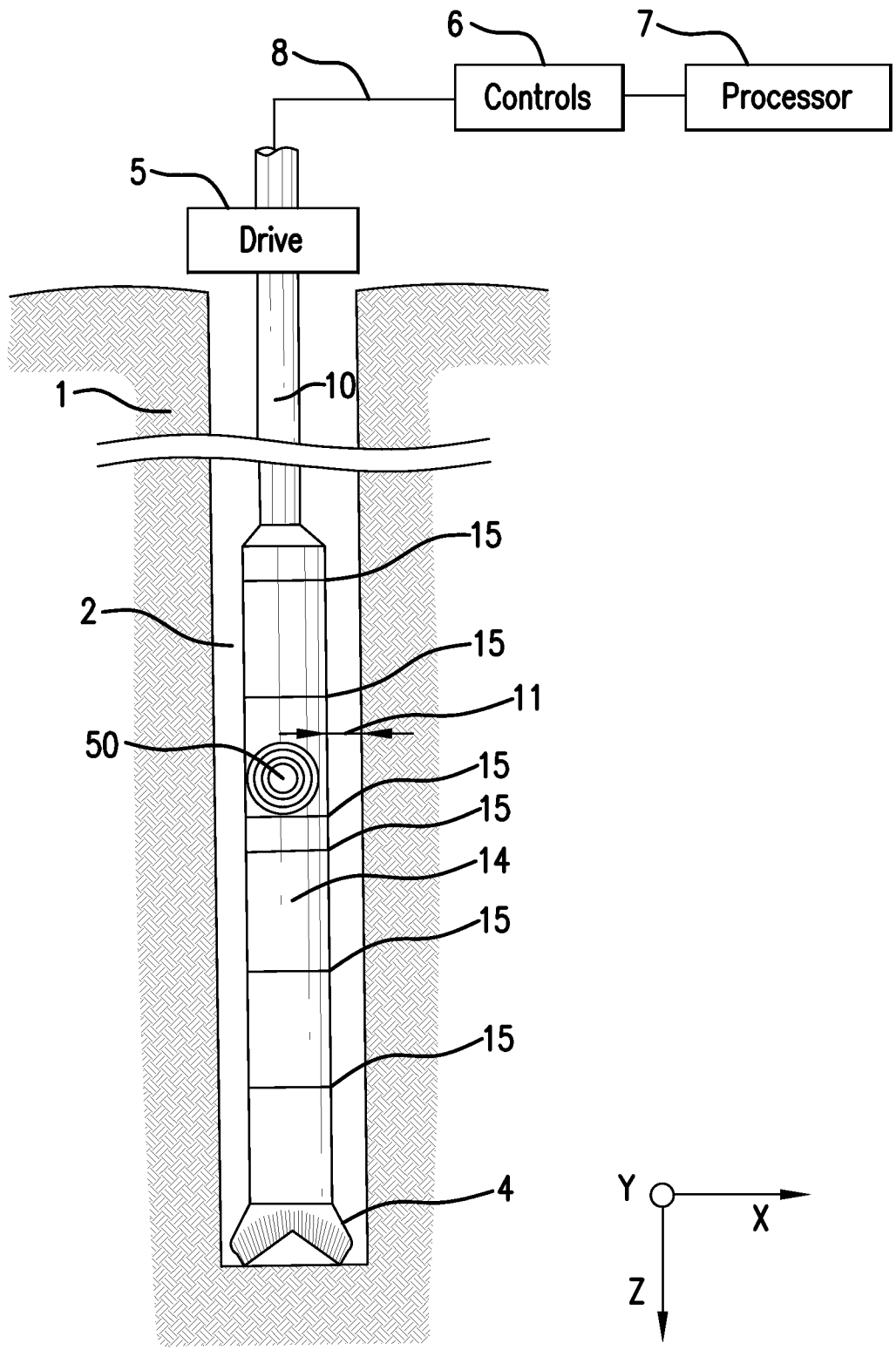
FIG. 4 depicts aspects of an apparatus for conducting logging while drilling.

Referring now to FIG. 4, there are shown aspects of an exemplary embodiment of an instrument 50 for conducting "logging-while-drilling" (LWD). The instrument 50 is included within a drill string 10 that includes a drill bit 4. The drill string 10 provides for drilling of a borehole 2 into earth formations 1. The drill bit 4 is attached to a drill collar 14. The drill string 10 may include a plurality of couplings 15 for coupling various components into the drill string 10. The drill string 10 is one example of a "carrier" for conveying the instrument 50 through the borehole 2. In wireline logging, the carrier is an armored wireline configured to convey the instrument 50. The wireline can also provide a communications medium for communications between the instrument 50 and remote components such as a processor or computer processing system.

Generally, the borehole 2 is filled with drilling mud. Drilling mud may be introduced for a variety of reasons, including provision of a pressure barrier. In some instances, it is advantageous to use oil-based-mud as the drilling mud. The instrument 50 disclosed herein is particularly useful in the presence of oil-based-mud (OBM).

As a matter of convention herein and for purposes of illustration only, the instrument 50 is shown as traveling along a Z-axis, while a cross section of the instrument 50 is realized along an X-axis and a Y-axis.

In some embodiments, a drive 5 is included and provides for rotating the drill string 10 and may include apparatus for providing depth control. Control of the drive 5 and the instrument 50 is achieved by operation of controls 6 and a processor 7 coupled to the drill string 10. The controls 6 and the processor 7 may provide for further capabilities. For example, the controls 6 are used to power and operate sensors (such as antenna) of the instrument 50, while the processor 7 receives and at least one of packages, transmits and analyzes data provided by the drill string 10 and/or components therein. In various embodiments of instruments for logging while drilling (LWD), the instrument 50 processes at least some of the data collected downhole.

Figure 5:
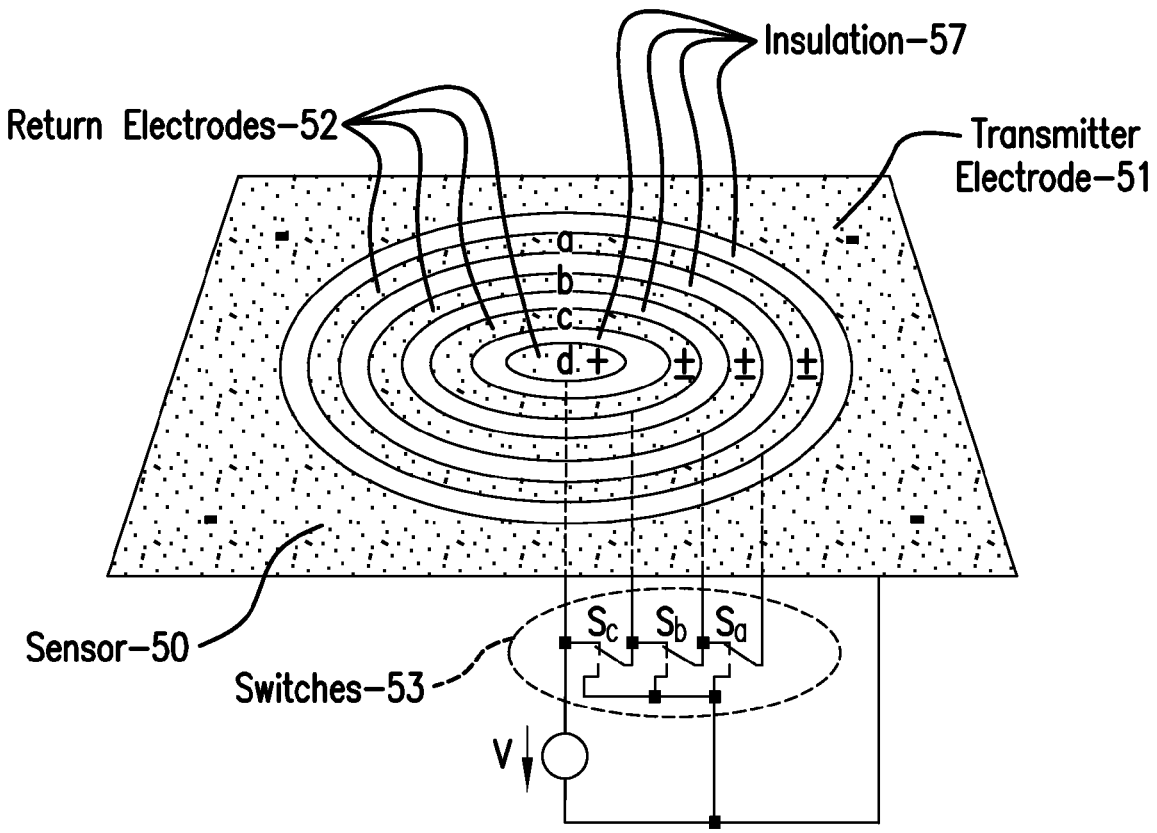
FIG. 5 depicts a sensor according to the teachings herein.

Considering the instrument 50 now in greater detail, and also with reference to FIG. 5, in this embodiment, the instrument 50 includes a plurality of electrodes, and is referred to in the following discussion as a "sensor 50." For convention, the electrodes of the sensor 50 include at least one transmitter electrode 51 and a plurality of return electrodes 52. Each of the electrodes is separated from the other electrodes by an insulator 57. At least one sensor 50 may be disposed on an outer surface of the drill string 10 as deemed appropriate.

Generally, the sensor 50 includes a plurality of switches 53. The switches 53 provide for controlling application of voltage to each of the electrodes. In short, each of the switches 53 may be toggled to provide for various arrangements of "firing" or energizing of each electrode. The voltage provided to each electrode may be of any frequency deemed appropriate, in any duration deemed appropriate, and in any combination as deemed appropriate. By controlling arrangement of the switches 53, an apparent size of the return electrode 52 can be modified. Thus, not only is the size of the return electrode modified, but if a ring is switched to opposite polarity, also the size of the transmitter electrode is changed.

Generally, a power supply for the sensor 50 provides alternating current (AC) that is in a relatively high frequency, f, range (for example, of about 1 MHz to about 10 MHz). The sensor 50 may be operated at frequencies, f, above or below this range. For example, the sensor 50 may be operated in frequency ranges from about 100 kHz to 100 MHz.

In some embodiments, the return electrodes 52 are referred to as "sensor electrodes" and in other embodiments may be referred to as "button electrodes," or simply as a "button." In operation, the transmitter electrode 51 provides for one pole of an electric dipole, while the at least one return electrode 52 provides for the other pole. Accordingly, the sensor 50 makes use of a single electric dipole for electric imaging, generally at a high-frequency, f. Thus, it should be recognized that the terms "transmit" and "return" and the various forms of these terms are merely illustrative of aspects of operation of the instrument 50, particularly for embodiments using AC current, and are therefore not to be construed as limiting of the instrument 50.

In some embodiments, achieving different button sizes at one location is accomplished by changing polarity of electrode rings for the return electrodes 52. That is, the switches may be arranged so that inner electrode rings are dominating the outer rings or the other around. More specifically, only if the inner ring (c) has the same polarity as the button in the center (d), the polarity of the next outer ring (b) can be switched to the polarity of the inner electrodes, etc. In this way, one can guarantee that no alternating polarities are selectable. Of course, one should recognize that an apparent size of the transmitter electrode may be altered. For example, the outer return electrode (a) may be set to a polarity of the transmitter electrode 51. Other combinations may be had.

Generally, the AC voltage source between the return electrode(s) 52 and transmitter electrode 51 is applied to provide sufficient conditions for injecting current, I, into the formation 1. During the operation, the electrodes are generally maintained under an equivalent electrical potential. An output of the sensor 50 includes impedance measured between each return electrode 52 and the transmitter electrode 51. Generally, the sensor 50 is mounted on an outer surface of the drill 10 and results in 360 degree coverage for imaging of the formation 1.

Although it is considered that the sensor 50 is generally operated with supporting components as shown (i.e., the controls 6 and the processor 7), one skilled in the art will recognize that this is merely illustrative and not limiting. For example, in some embodiments, the sensor 50 may include at least one on-board processor 7.

Turning now to the invention in greater detail, in one embodiment (see FIG. 5), a series of the measurement return electrodes 52 (denoted as "a," "b," "c," and "d") are placed on a single circumferential pad attached to the drill 10. The return electrodes 52 of different sizes are separated by isolative gaps, each gap including an insulator 57. The source voltage of high frequency (generally of 1 MHz or above) is applied between the transmitter electrode(s) 51 and the return electrode(s) 52. Generally, all of the return electrodes 52 are kept under the same electrical potential driven by the applied voltage, V. Generally, the measured value is the complex impedance, Z, through each return electrode 52, or combination of return electrodes 52. This arrangement provides capacitive coupling between the sensor 50 and the formation 1 and enables imaging of the formation 1 even in the conditions of a very resistive oil-based mud.

Using the sensor 50 as described above, users are effectively provided with a sensor of varying sizes. This provides users with an ability to, among other things, estimate a dimension of the standoff 11 (the dimension being useful for correcting data collected from the formation 1) and also to maintain a desired resolution during imaging (under conditions of variable standoff).

Equation (1) below provides a relationship where estimates of standoff 11 may be determined. That is, by performing measurements with return electrodes 52 of different sizes and by applying Eq. (1), standoff 11 may be estimated.

$$G \cdot \text{Re}(\dot{Z}) = R_f \quad (1);$$

In Eq. (1), $\text{Re}(\dot{Z})$ represents a real part of measured impedance, $R_f$, represents a resistivity of the formation, and G represents a geometric factor.

Figure 6:
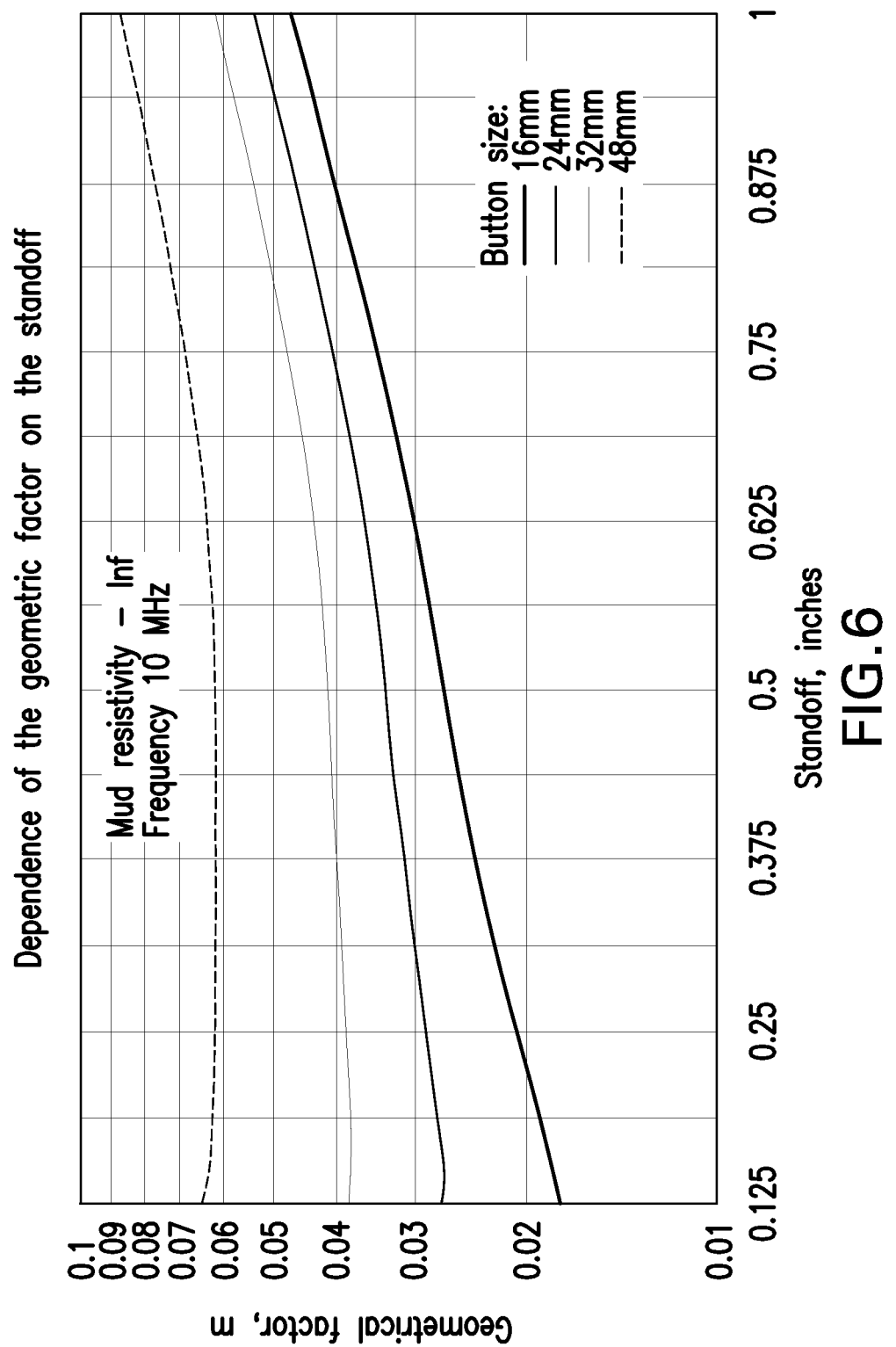
FIG. 6 is a graph depicting dependence of a geometric factor on standoff.

It turns out that even in the presence of highly resistive drilling mud, the geometric factor, G, changes with the standoff 11. The change becomes more pronounced for the more pronounced standoff and a smaller effective return electrode 52. This effect is illustrated in FIG. 6 where mathematical modeling results of the geometric factor, G, are presented. In this example, the results correspond to sizes of 16 millimeters (mm), 24 mm, 32 mm and 48 mm. The operating frequency in this example was 10 MHz, the distance from the center of the return electrode to the transmitter electrode was 96 mm. The resistivity, $R_f$, (assuming a homogeneous formation) was 10 ohm-meters. As this figure shows, the geometric factor, G, of a large 48 mm return electrode 52 does not depend on the standoff 11, if the standoff 11 is less than about 1.5875 centimeters (cm, or about 0.625 inches). For return electrodes 52 of 16 mm and 32 mm, the geometric factor, G, depends on the standoff 11 in the whole analyzed range of standoffs. If corrections are not made for this effect, the readings from small return electrodes 52 will produce an inaccurate image. Accordingly, using an imaginary part of the impedance for the corrections may address the inaccuracy.

Figure 7:
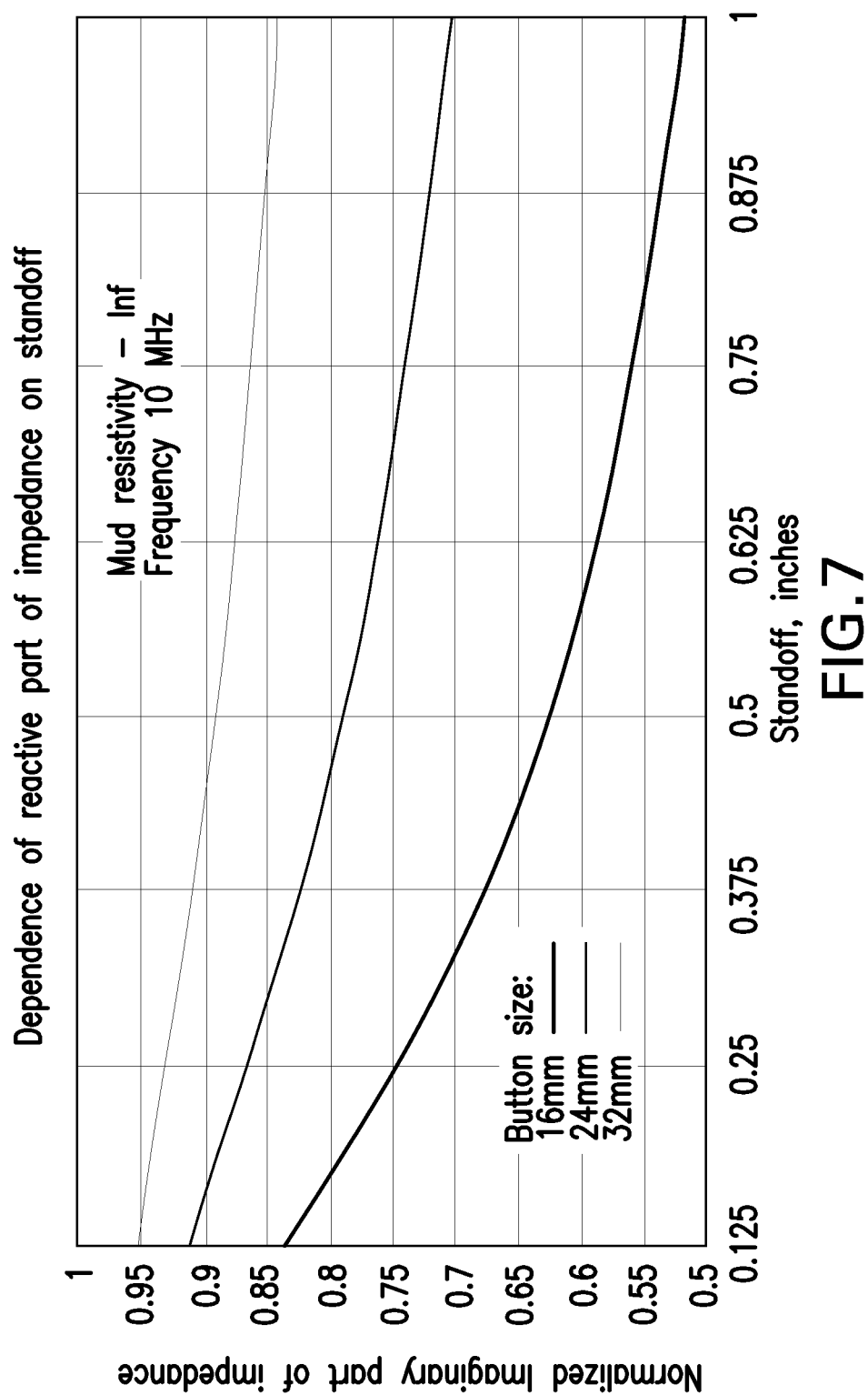
FIG. 7 is a graph depicting dependence of a reactive part of the impedance on standoff, where the curves are normalized to the largest return electrode.

As shown in FIG. 7, the normalized imaginary part of the impedance depends differently on the standoff. That is, there is a small difference between impedances where standoff is about 0.3175 cm (0.125 inches), while there is a significant difference between impedances at about 1.27 cm (about 0.5 in). To quantify behavior of the imaginary part of the impedance for the different size electrodes, the curves of FIG. 7 may be divided by the curve corresponding to 48 mm size return electrode. The result of the division is presented in FIG. 8 and represents a chart that is used for the standoff estimation. In order to perform the correction, a ratio between readings corresponding to an individual return electrode and the 48 mm return electrode 52 should be calculated. Then, for a given size of the return electrode (as shown in FIG. 7) and calculated ratio (provided along the y-axis of FIG. 7) the resulting graph enables finding of a standoff value (shown along the x-axis). As soon as the standoff 11 is known, the correction chart, such as the exemplary one provided in FIG. 6, may be used to find the geometric factor, G, corresponding to the given size of return electrode 52 and standoff 11.

In this process, a selection of readings that maintain acceptable vertical resolution under the conditions of variable standoff may be made. In other words, under certain standoff conditions, readings from the small return electrodes 52 become non-recoverable. Even after being corrected for standoff, the readings cannot deliver an image of the formation 1. Under such circumstances, readings corresponding to the return electrode 52 which is less affected by the standoff may be selected over readings from the smaller return electrodes 52. These readings are generally capable of providing an image of the formation 1. Modeling results demonstrate that an acceptable quality image is obtained when the size B return electrode 52 is at least three times bigger than the standoff. Using this criterion, readings that provide the best image for the given (estimated) standoff may be adaptively selected. Under conditions of a rugose borehole, this selection is similar to a low-pass filter, which filters out high frequency component from the data. This effect is illustrated in FIG. 8.

Figure 8:
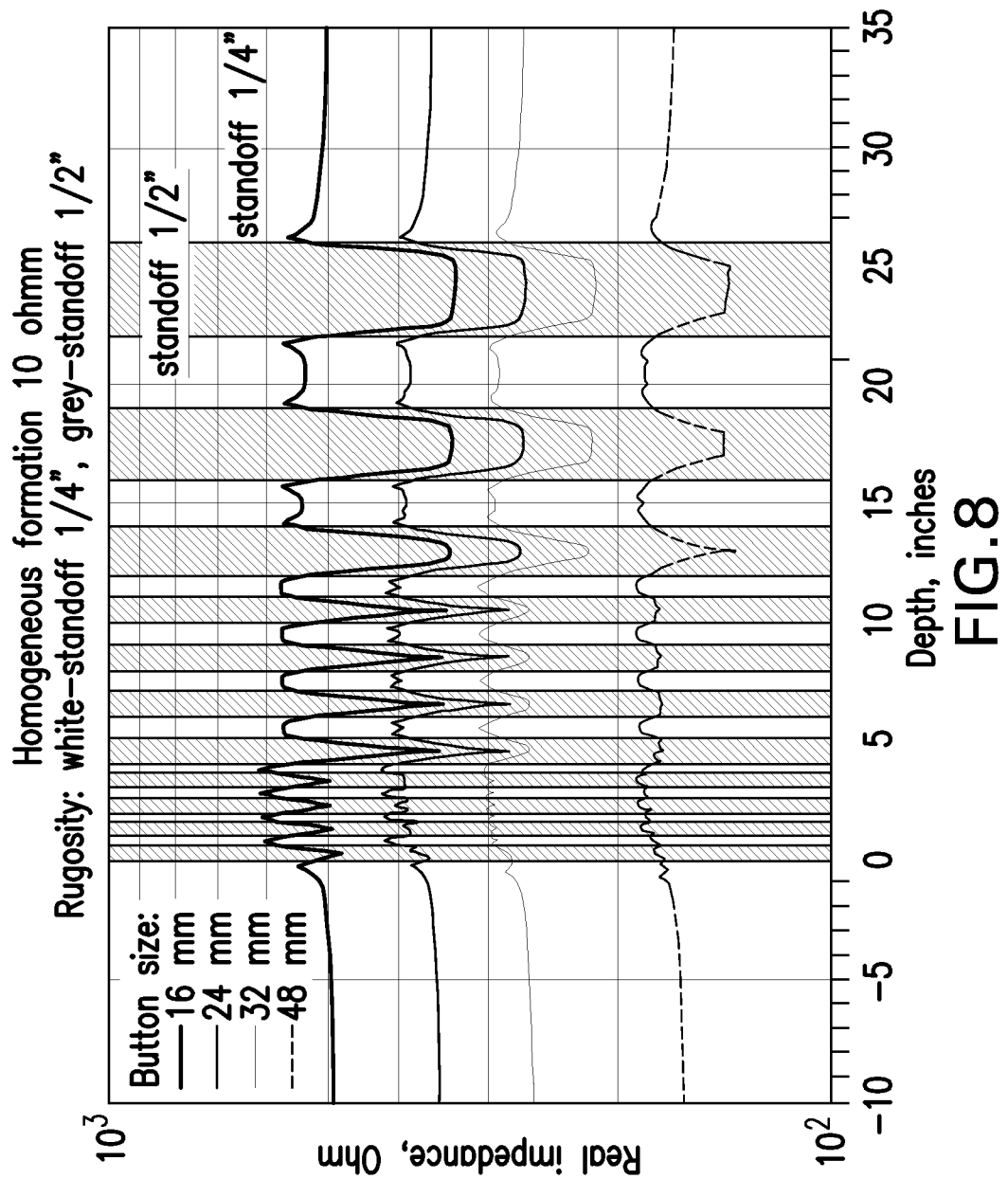
FIG. 8 is a chart useful for estimating standoff as a function of real impedance.

In FIG. 8, results of mathematical modeling are presented for different sizes of the return electrodes 52. These results are provided for a homogeneous formation 1 and a rugose borehole. In this example, rugosity is simulated by changing the size of the borehole such that the standoff is periodically changing from 0.25 to 0.5 in. The width of the standoff varies from about 0.5 inches to about 4 inches. As shown in FIG. 8, the smaller the return electrodes, the bigger the effect of borehole irregularities on the readings. The opposite is true as well. That is, effectiveness of suppression of false readings is increased with bigger return electrodes 52.

In the examples of FIGS. 6 and 7, the results were obtained under the assumption that resistivity of the oil-based mud, $R_{obm}$, is about five or more orders of magnitude bigger than the resistivity of formation, $R_f$. Although this assumption is generally valid for the vast majority of practical cases, there are some borehole fluids that are less resistive relatively to the formation. In this case, an additional step that includes correction for resistivity of the mud, $R_m$, should be performed.

This correction may be based a technique such as the one provided below. Correction for the finite resistivity of the mud should be performed at the first stage of the processing prior to the geometric factor correction.

Figure 9:
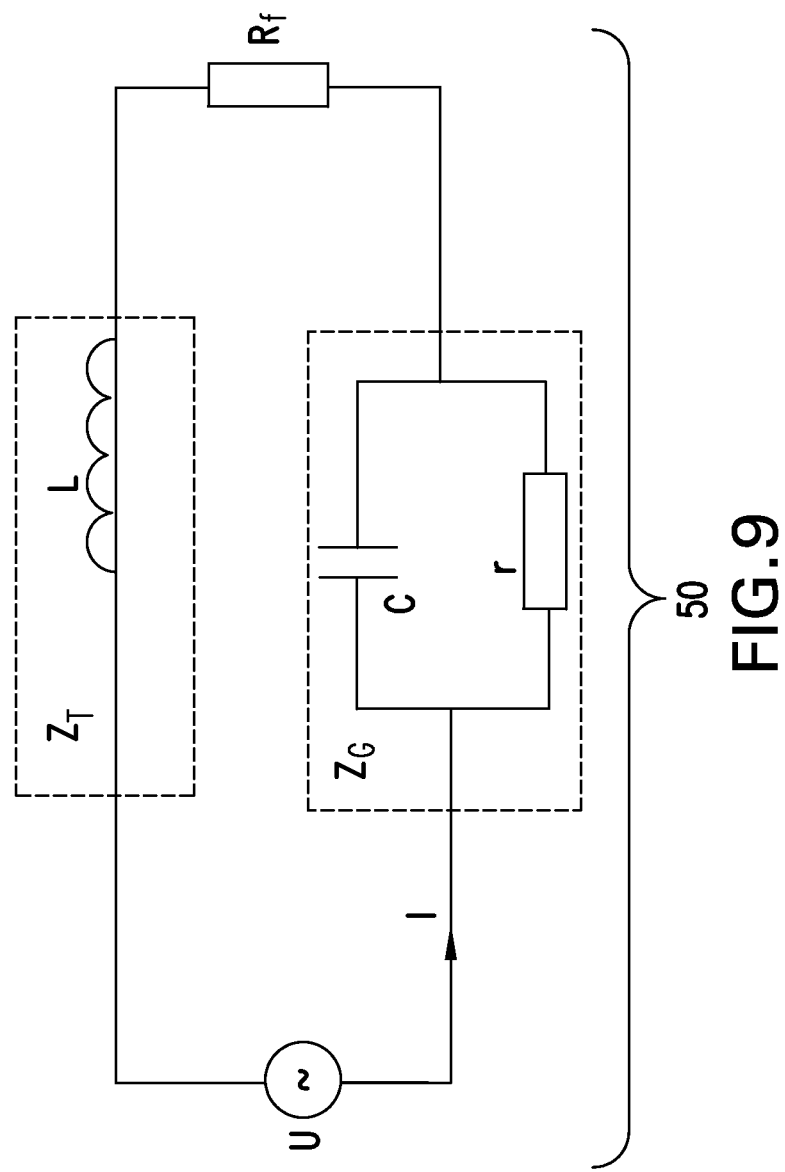
FIG. 9 is a circuit diagram effectively depicting aspects of standoff dependence for the sensor.

As an example of correction for less resistive mud, consider the effective schematic circuit diagram presented in FIG. 9. The circuit provided may be equated to aspects of the electric function of the sensor 50. This example shows that the measured effective impedance, $Z_e$, depends on the internal impedance of the tool, $Z_T$, the impedance due to the gap between the sensor and the formation, $Z_G$, and the formation resistivity, $R_f$. For simplicity, it is assumed that there is no gap between the return electrode 52 and the formation 1. For applied voltage, U, and measured current, I, then the effective impedance, $Z_e$, is estimated by Eq. (2):

$$Z_e = Z_T + Z_G + R_f = \frac{U}{I} \qquad (2)$$

In case of a conductive formation (where resistivity of the formation $R_f \lesssim 10$ ohm-m) and oil-based mud, the contribution of the formation into the effective impedance, $Z_e$, is small ($R_f \ll Z_T + Z_G$) and it can be expected that a reduction of the sensitivity of the measured impedance to the resistivity of formation, $R_f$. The gap impedance, $Z_G$, which depends on the mud properties and the receiver standoff, becomes a major contributor into the effective impedance, $Z_e$. Note that in Eq. (2), $Z_T$ represents an impedance of the sensor 50. To extract the information about formation resistivity, $R_f$, multi-frequency measurements may be employed prior to data processing. Consider using two frequencies. First, assume that impedance measurements have been conducted using a first frequency, $f_1$ and a second frequency, $f_2$. Each frequency ($f_1$, $f_2$) permits estimation of correlating effective impedances $Z_{e1}$ and $Z_{e2}$. This estimating may be performed according to Eq. (3):

$$Z_{e1} = i\omega_1 L + R_f + \frac{1}{r^{-1} + i\omega_1 C} = A_1 + iB_1, \qquad (3)$$

$$Z_{e2} = i\omega_2 L + R_f + \frac{1}{r^{-1} + i\omega_2 C} + A_2 + iB_2$$

where $A_1$, $A_2$ and $B_1$, $B_2$ correspond to the real and imaginary parts of the impedances $Z_{e1}$ and $Z_{e2}$, respectively. Eqs. (3) may be rearranged as provided in Eqs. (4), and Eqs. (5):

$$A_1 - A_2 = r^{-1}\left(\frac{1}{r^{-2} + (\omega_1 C)^2} - \frac{1}{r^{-2} + (\omega_2 C)^2}\right), \qquad (4)$$

$$\frac{B_1}{\omega_1} - \frac{B_2}{\omega_2} = -C\left(\frac{1}{r^{-2} + (\omega_1 C)^2} - \frac{1}{r^{-2} + (\omega_2 C)^2}\right)$$

$$\frac{\frac{B_1}{\omega_1} - \frac{B_2}{\omega_2}}{A_1 - A_2} = G = Cr \qquad (5)$$

Combining Eq. (5) with the first equation of Eqs. (4), resistivity of the gap, $R_g$, may be found, as provided in Eq. (6):

$$R_g = (A_1 - A_2) \bigg/ \left(\frac{1}{1 + (\omega_1 G)^2} - \frac{1}{1 + (\omega_2 G)^2}\right) \qquad (6)$$

Equation (5) allows estimation of capacitance C between the return electrode 52 and the formation 1, while resistivity of formation, $R_f$, may be derived from the Eq. (3), for example, by Eq. (7):

$$R_f = A_1 - \frac{(\omega_1 C)^2 r}{r^2 + (\omega_1 C)^2} = A_2 - \frac{(\omega_2 C)^2 r}{r^2 + (\omega_2 C)^2} \qquad (7)$$

Figure 10:
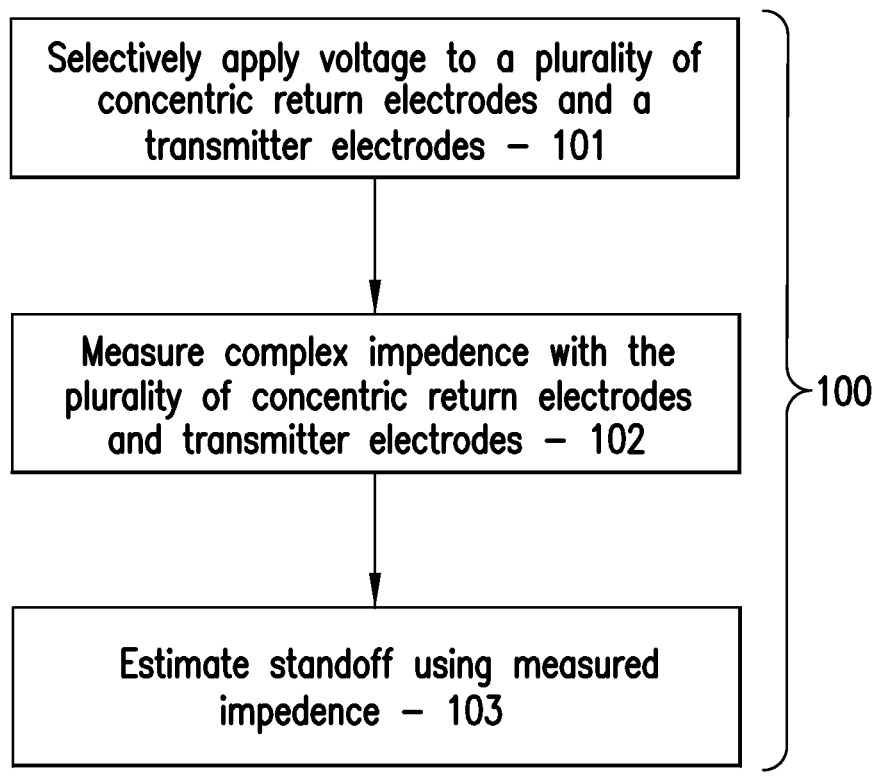
FIG. 10 is a flow chart providing an exemplary method for using the sensor of FIG. 5.

Accordingly, and as depicted in FIG. 10, an exemplary and non-limiting method for estimating standoff 100 calls for selectively applying voltage to a plurality of concentric return electrodes and transmitter electrode 101; measuring the impedance 102; and estimating standoff using the measured impedance 103.

In summary, a method for imaging borehole wall resistivity with 360 degree coverage in the presence of oil-based mud is described. A sensor for the imaging includes a circumferential pad mounted on a drill and containing a series of variable size buttons electrodes (i.e., return electrodes) separated by insulating gaps. That is, a size of the button electrode is determined by a number of ring electrodes having the same polarity. The voltage source between symmetrical transmitting electrodes and sensor buttons is applied to provide sufficient conditions for injecting current into the formation. An output of the sensor comprises a measurement of the complex impedance for each sensor electrode. The set of the buttons of different size provides enough flexibility to adjust imaging for the variable standoff conditions by correcting for the variable standoff and selecting readings the best suitable for the determined standoff. The 360 degree coverage is achieved via combination of the pad's shape, pad's azimuthal rotation, and a system to centralize the position of the imager in the well.

Another approach to estimate resistivity or its inverse conductivity of a formation while compensating for standoff effects is now discussed. The term "compensating" relates to estimating a value of a formation property that has increased accuracy due to reducing or eliminating any standoff influences in measurements. In this approach, data from a plurality of formation measurements is input into an artificial neural network (ANN). The data includes real and imaginary parts of measured formation impedance using various configurations of ring electrodes such as the electrodes 52 a,b,c,d shown in FIG. 5. Examples of the different electrode configurations are presented below. Once the measurement data is input into the ANN, the ANN, which was previously trained, calculates the conductivity of the formation compensating for various standoffs that occurred during the measurements.

Figure 11:
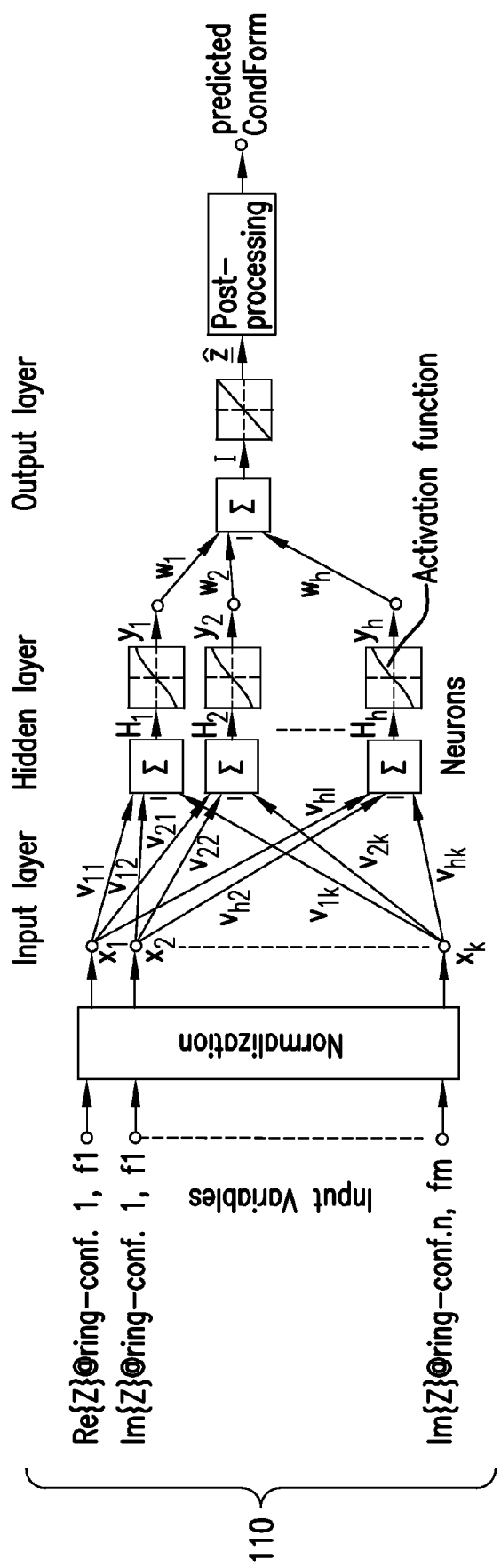
FIG. 11 depicts aspects of an exemplary embodiment of an artificial neural network.

Reference may now be has to FIG. 11, which depicts aspects of an exemplary embodiment of an ANN 110. The ANN 110 in FIG. 11 is a multilayer feed-forward (MLFF) network. The MLFF network shown has three layers: an input layer, an output layer, and a hidden layer. The number of neurons in the hidden layer is set to 16 in this embodiment. A non-linear activation function in the ANN 110 in one embodiment is selected to a Tan-Sigmoid (Tansig) transfer function. For numerical reasons, the formation conductivity, $\sigma_F$, is a logarithmical number. Hence, the ANN 110 can be configured to provide a logarithmical number as output. It can be appreciated that the ANN 110 can be implemented by a processor such as in a computer processing system. The processor can be disposed downhole at the carrier or at the surface of the earth. The processor 7 (see FIG. 12) is one example of a processor for implementing the ANN 110.

Figure 12:
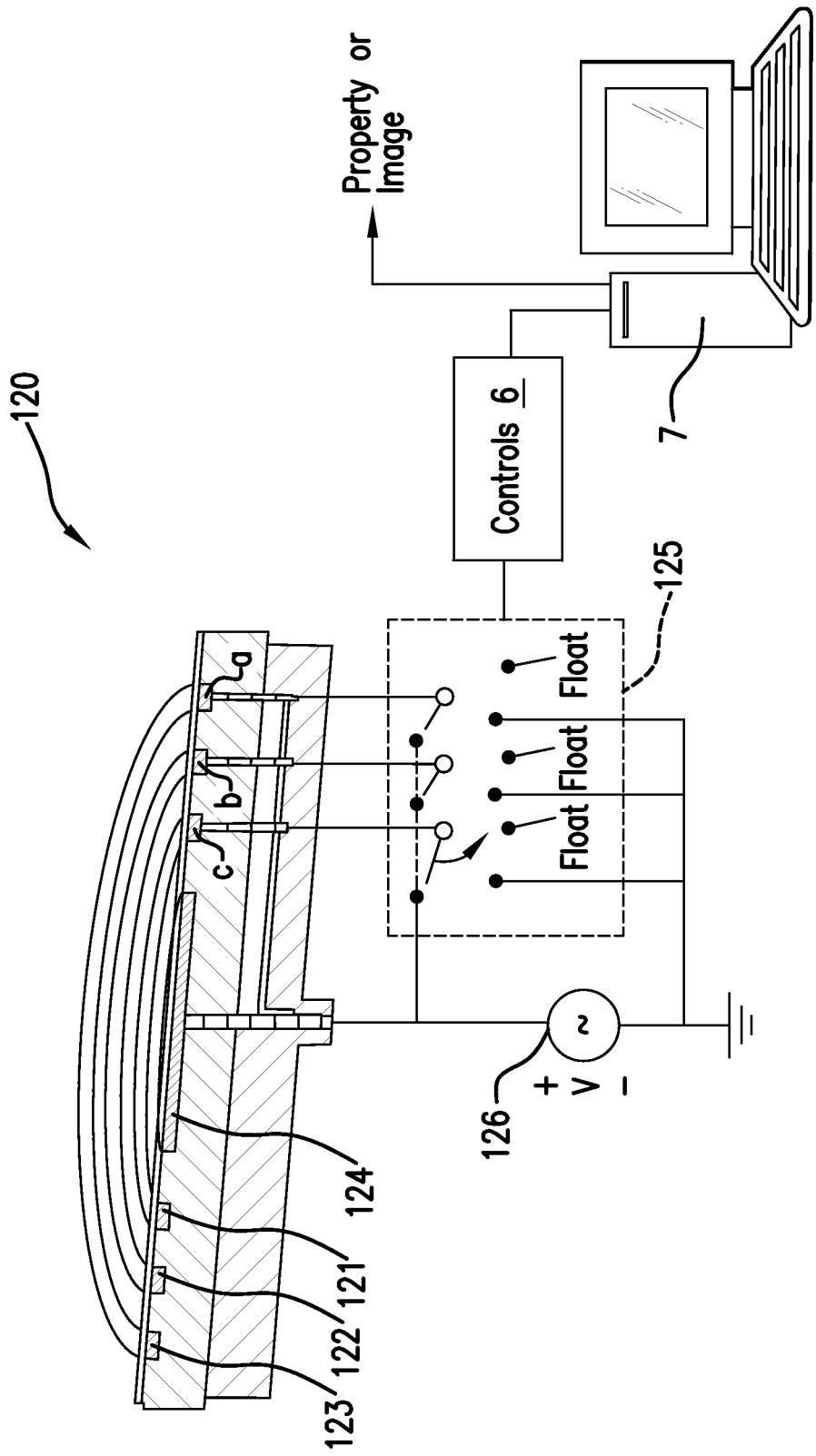
FIG. 12 depicts aspects of a sensor having a center electrode and three ring electrodes.
Figure 13D:
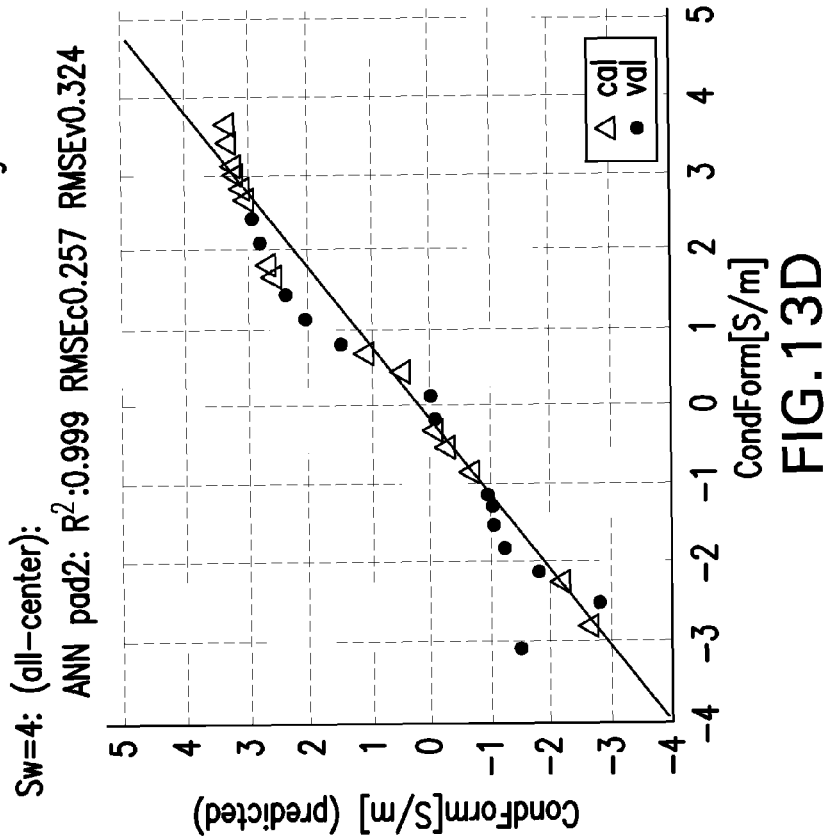
FIGS. 13 A-I, collectively referred to as FIG. 13, illustrate results of testing to validate prediction capabilities of the artificial neural network.
Figure 13C:
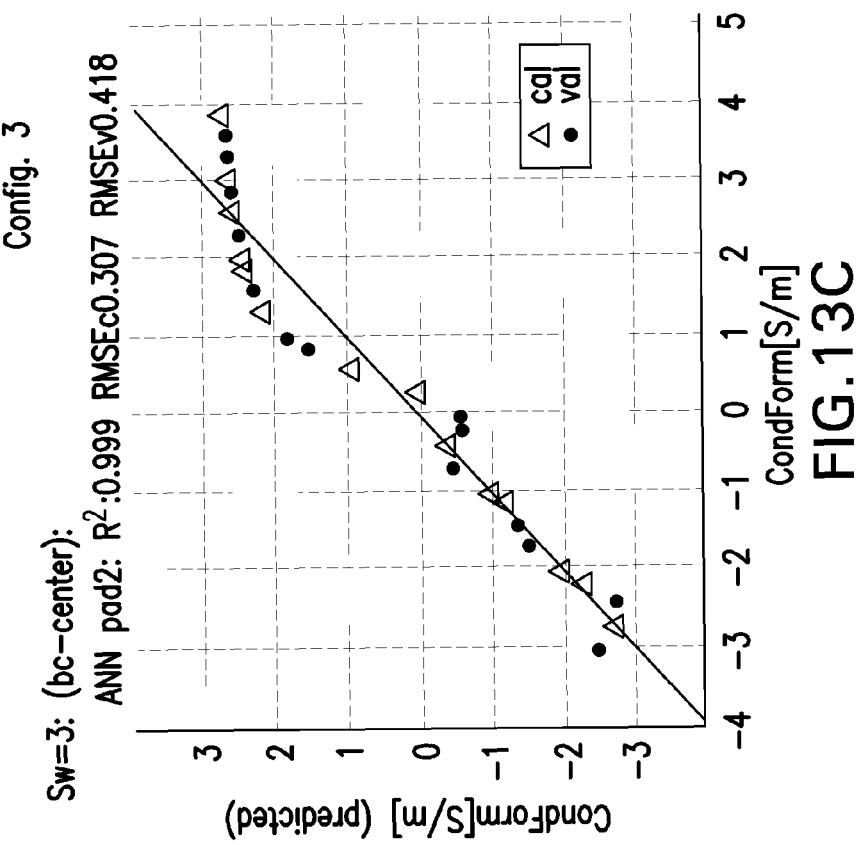
Figure 13H:
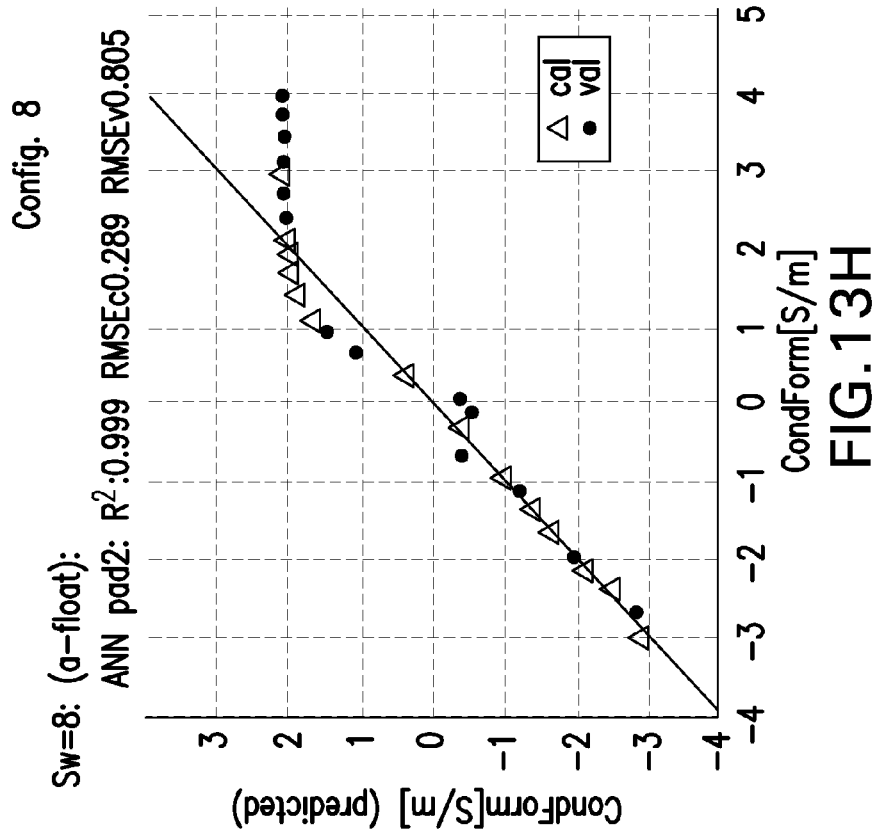
Figure 13G:
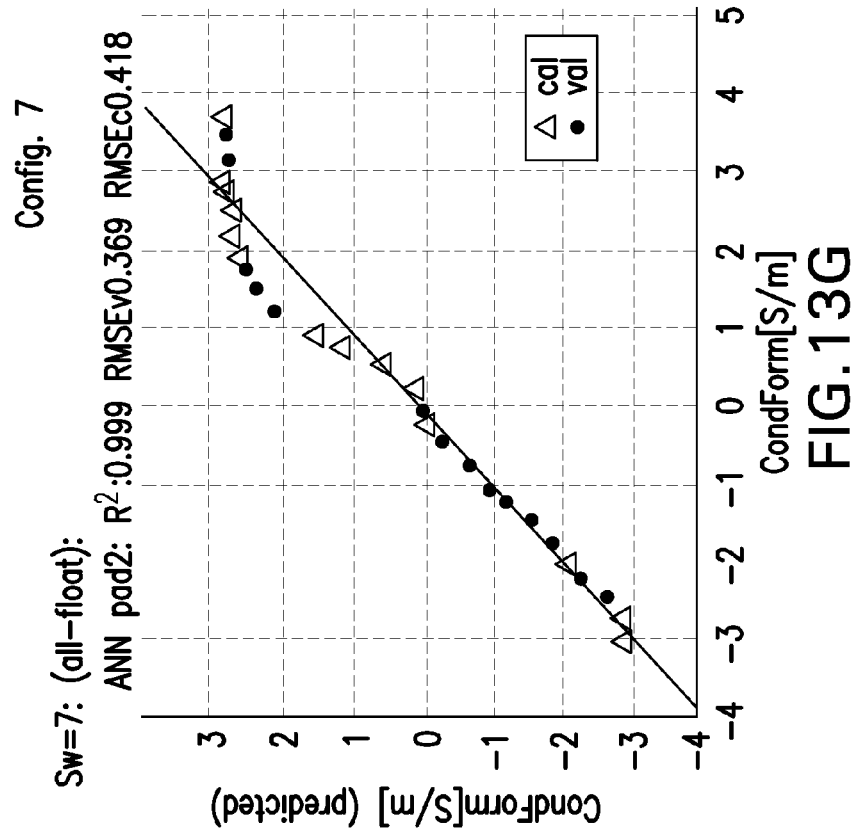
Figure 13I:
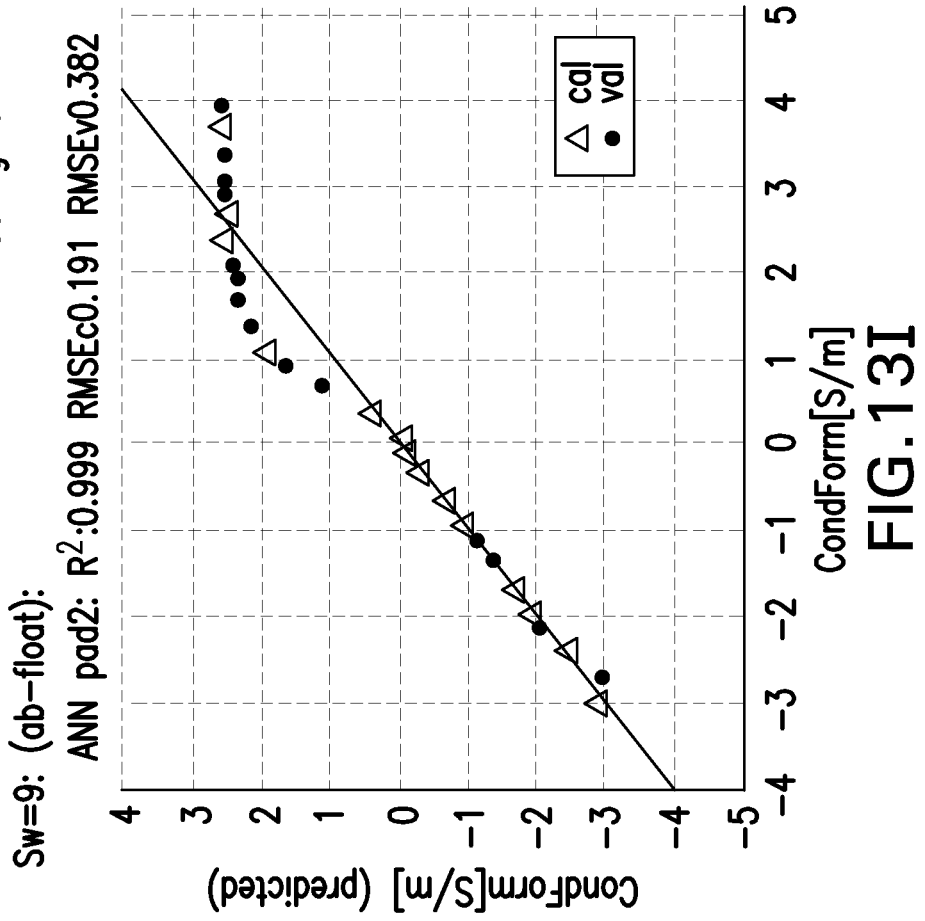

As noted above, various configurations of concentric electrodes are used to perform formation conductivity measurements at various standoffs. FIG. 12 illustrates a side cross-sectional view of a sensor 120 having a center electrode 124, a first ring electrode 121, a second ring electrode 122, and a third ring electrode 123, which are similar to the electrode configuration shown in FIG. 5. The ring electrodes 121-123 are concentric with the center electrode 124. Not shown is a return electrode such as electrode 51 shown in FIG. 5 that may be used for receiving current injected by the electrodes 121-124. Switches 125 and voltage source 126 are configured to apply voltage V at frequency f to various combinations of the electrodes 121-124. The switches 125 are also configured to connect selected ring electrodes to ground or to let selected ring electrodes float. Current (I) is injected through the standoff and into the formation by the electrodes connected to the voltage source 126. Injected current returns through the standoff to the return electrode or ring electrodes connected to ground. Current resulting from applying the voltage V at selected electrodes is measured to determine the real and imaginary parts of the measured impedance (Impedance=V/I). In the embodiment of FIG. 12, the controls 6 are configured to operate the switches 125. The processor 7 is configured to receive voltage or current measurements performed by electrical sensors (not shown) at the electrodes 121-124 or the return electrode. Table 1 presents one example of the various combinations and applications of the electrodes 121-124 used for measuring the impedance of the formation.

TABLE 1

| Electrode Configuration | Center Electrode | First Ring Electrode | Second Ring Electrode | Third Ring Electrode |
|---|---|---|---|---|
| 1 | Voltage V applied | Ground | Ground | Ground |
| 2 | Voltage V applied | Voltage V applied | Ground | Ground |
| 3 | Voltage V applied | Voltage V applied | Voltage V applied | Ground |
| 4 | Voltage V applied | Voltage V applied | Voltage V applied | Voltage V applied |
| 5 | Voltage V applied | Float | Ground | Ground |
| 6 | Voltage V applied | Float | Float | Ground |
| 7 | Voltage V applied | Float | Float | Float |
| 8 | Voltage V applied | Voltage V applied | Float | Float |
| 9 | Voltage V applied | Voltage V applied | Voltage V applied | Float |

For training purposes, twenty-eight data sets were input into the ANN 110. For each data set, the standoff was 4 mm, the formation permittivity was 10, the mud permittivity was 5 and the mud conductivity was zero. Twenty-eight values of formation conductivity were input ranging from 0.001 S/m to 7000 S/m. Test frequency was in the 40-50 MHz range.

Testing was performed to validate the prediction capabilities of the ANN 110 for the nine electrode configurations listed in Table 1. FIG. 13 illustrates the results of the test, which shows that matching between the training data sets and the output (i.e., validation) data sets is very good. The triangles represent calibration values while the dots represent validation values. This test confirms that the ANN 110 is able to predict the formation conductivity, $\sigma_F$, in principle without ambiguity.

Figures 14C, 14D:
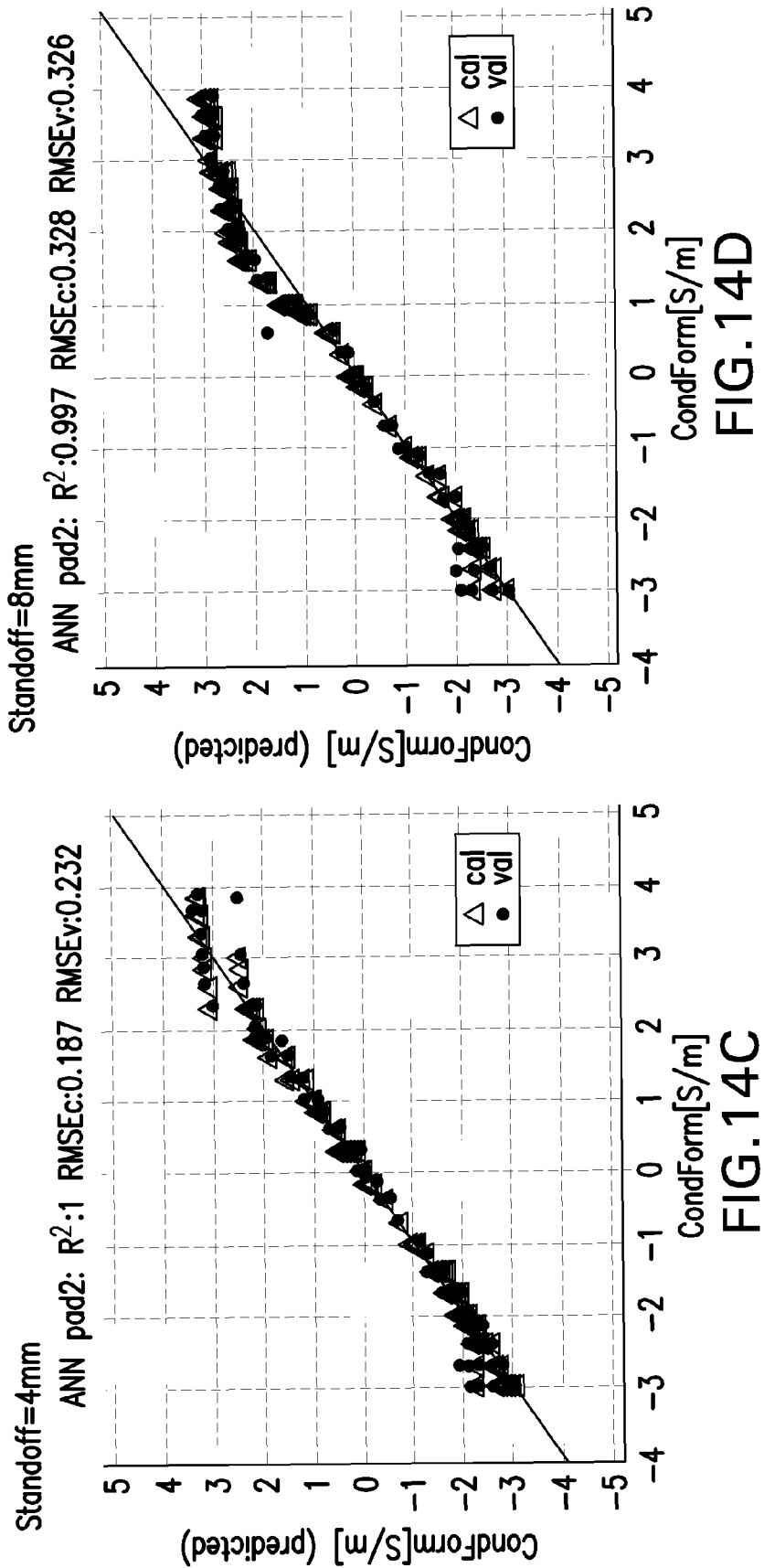
FIGS. 14 A-E, collectively referred to as FIG. 14, illustrate results of testing to validate prediction capabilities of the artificial neural network for the sensor for various standoff distances from the sensor to a wall of a borehole.
Figure 14E:
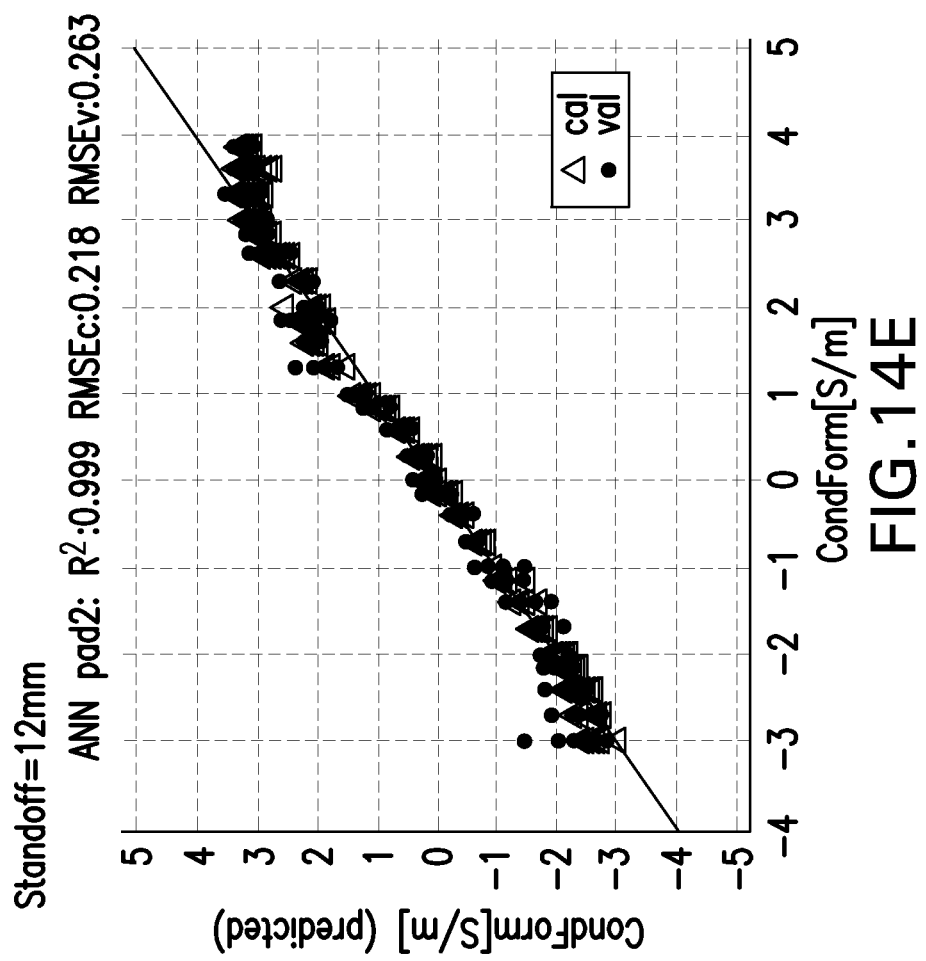
Figure 15:
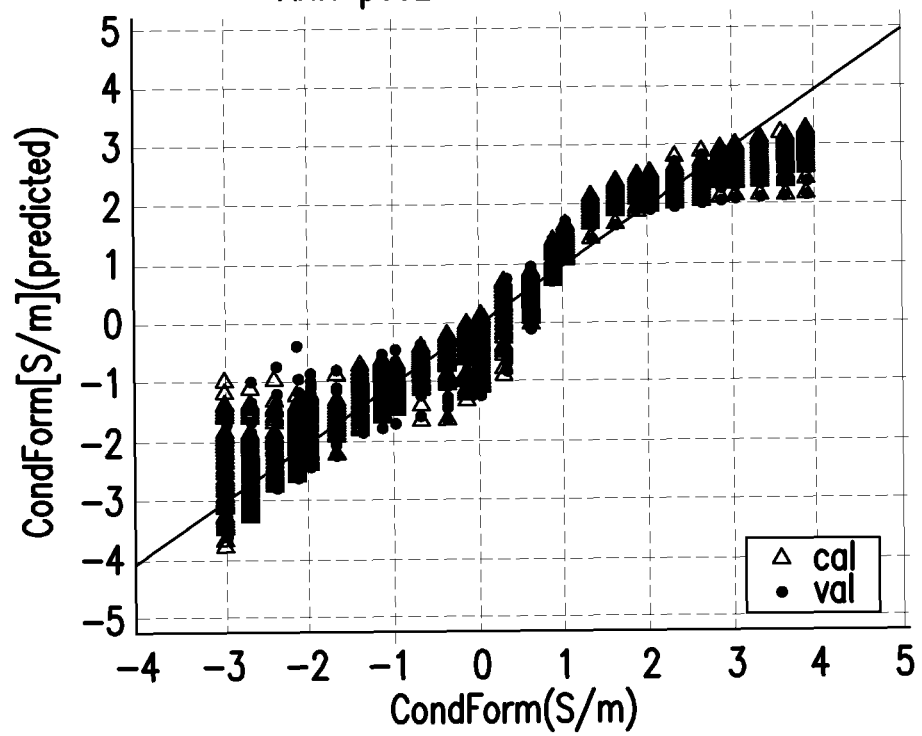
FIG. 15 illustrates one diagram that summarizes the testing results for the various standoff distances.

Other tests were then performed to confirm that the ANN 110 can compensate for standoff related influences or distortions. FIG. 14 illustrates results of these tests for varying formation conductivities for various constant values of standoff ranging from 1 mm to 12 mm at a test frequency of 50 MHz. The triangles represent calibration values while the dots represent validation values. Associated with each graph in FIG. 14 are a coefficient of correlation $R^2$ and a performance of calibration expressed as the root mean square error of the calibration (or training) group ($RMSE_c$) and the validation group ($RMSE_v$). They should be as low as possible and in the same order of magnitude. If $RMSE_c$ is considerably lower than $RMSE_v$, the ANN 110 can be adjusted in order to remove this over fitting. As can be seen in the diagrams in FIG. 14, the ANN 110 is able to predict the conductivity of the formation with an accuracy of $0.148 \leq RMSE_v \leq 0.327$. FIG. 15 summarizes the results of these tests in one diagram. In FIG. 15, the triangles represent calibration values while the dots represent validation values.

Figure 16:
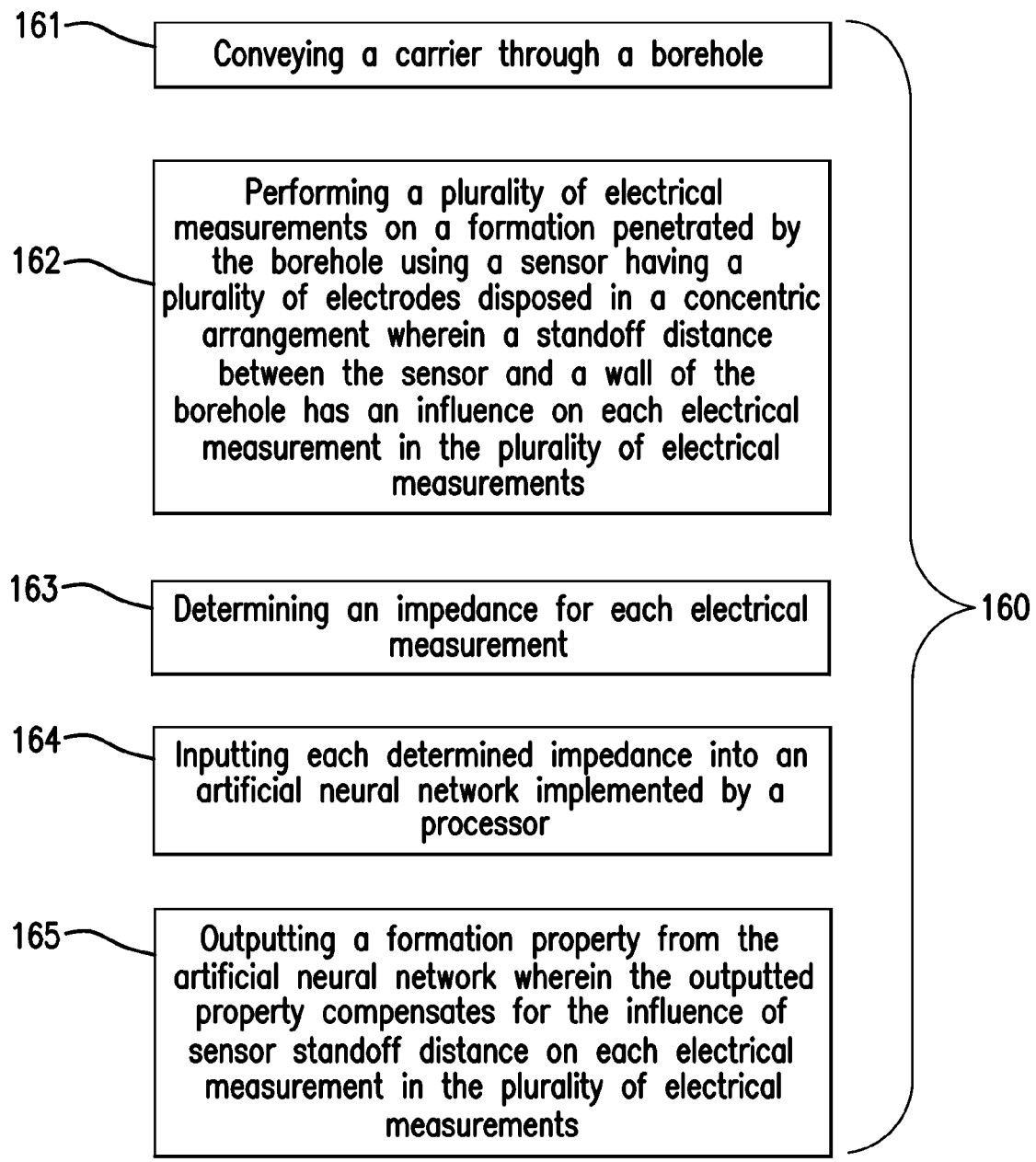
FIG. 16 presents one example of a method for estimating a property of a formation penetrated by a borehole.

FIG. 16 presents one example of a method 160 for estimating a property of an earth formation penetrated by a borehole. The method 160 calls for (step 161) conveying a carrier through the borehole. Further, the method 160 calls for (step 162) performing a plurality of electrical measurements on the formation using a sensor having a plurality of electrodes disposed in a concentric arrangement wherein a standoff distance between the sensor and a wall of the borehole has an influence on each electrical measurement in the plurality of electrical measurements. Further, the method 160 calls for (step 163) determining an impedance for each electrical measurement. Further, the method 160 calls for (step 164) inputting each determined impedance into an artificial neural network implemented by a processor. Further, the method 160 calls for (step 165) outputting the property from the artificial neural network wherein the outputted property compensates for the influence of sensor standoff distance on each electrical measurement in the plurality of electrical measurements. Non-limiting examples of the property include resistivity, conductivity or an image of the borehole as a function of depth in the borehole using variations in the estimated property with depth. The method 160 can also include training the artificial network by inputting a plurality of data sets where each data set includes sensor standoff, formation conductivity, formation permittivity, borehole fluid conductivity, and borehole fluid permittivity, and test frequency.

In support of the teachings herein, various analysis components may be used, including a digital and/or an analog system. For example, the controls 6 or the processor 7 may include the analog or digital system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), motive force (such as a translational force, propulsional force or a rotational force), magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. The logging tool 10 is one non-limiting example of a carrier. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first," "second" and "third" are used to distinguish elements and are not used to denote a particular order. The term "couple" relates to one component being coupled either directly to another component or indirectly to the another component via one or more intermediate components.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of estimating a property of an earth formation penetrated by a borehole, the method comprising:
    conveying a carrier through the borehole;
    performing a plurality of electrical measurements on the formation using a sensor disposed at the carrier and having a plurality of electrodes disposed in a concentric arrangement wherein a standoff distance between the sensor and a wall of the borehole has an influence on each electrical measurement in the plurality of electrical measurements;
    determining an impedance for each electrical measurement in the plurality of electrical measurements;
    inputting each determined impedance into an artificial neural network implemented by a processor; and
    outputting the property from the artificial neural network wherein the outputted property compensates for the influence of sensor standoff distance on each electrical measurement in the plurality of electrical measurements.

2. The method as in claim 1, wherein the property is conductivity or resistivity.

3. The method as in claim 1, wherein the sensor comprises a central electrode surrounded concentrically by a ring electrode.

4. The method as in claim 3, wherein the ring electrode comprises a plurality of ring electrodes.

5. The method as in claim 4, wherein performing a plurality of electrical measurements comprises applying a voltage V at frequency f to the central electrode.

6. The method as in claim 5, wherein performing a plurality of electrical measurements further comprises applying the voltage V at frequency f to one or more of the ring electrodes.

7. The method as in claim 6, wherein performing a plurality of electrical measurements further comprises switching one or more ring electrodes in the plurality of ring electrodes that concentrically surround the central electrode to ground or float using electrical switches that are configured to apply voltage to various combinations of the ring electrodes.

8. The method as in claim 6, wherein the frequency f comprises multiple frequencies.

9. The method as in claim 1, wherein each determined impedance comprises a real part and an imaginary part.

10. The method as in claim 1, further comprising training the artificial neural network by inputting a plurality of data sets into the artificial neural network each data set in the plurality of data sets comprising electrical data associated with a standoff value.

11. The method as in claim 1, further comprising adjusting the artificial network to reduce a difference between root mean square error of calibration data sets and root mean square error of validation data sets.

12. An apparatus for estimating a property of an earth formation penetrated by a borehole, the apparatus comprising:
    a carrier configured to be conveyed through the borehole;
    a sensor disposed at the carrier and comprising a plurality of electrodes disposed in a concentric arrangement, the sensor being configured to perform a plurality of electrical measurements on the formation wherein a standoff distance between the sensor and a wall of the borehole has an influence on each electrical measurement in the plurality of electrical measurements;
    a processor coupled to the sensor and configured to receive the plurality of electrical measurements for determining an impedance for each electrical measurement, the processor comprising an artificial neural network configured to receive each determined impedance and to output the property wherein the outputted property compensates for the influence of sensor standoff distance on each electrical measurement in the plurality of electrical measurements.

13. The apparatus as in claim 12, wherein the sensor comprises a central electrode and surrounded concentrically by a ring electrode.

14. The apparatus as in claim 13, wherein the ring electrode comprises a plurality of ring electrodes.

15. The apparatus as in claim 14, further comprising a power source configured to apply a voltage V at a frequency f to the central electrode.

16. The apparatus as in claim 15, further comprising one or more switches configured to apply the voltage V at the frequency f from the power source to various combinations of one or more selected ring electrodes that concentrically surround the central electrode.

17. The apparatus as in claim 16, wherein the one or more switches are further configured to switch the one or more selected ring electrodes to ground or float.

18. The apparatus as in claim 12, wherein the property is conductivity or resistivity.

19. The apparatus as in claim 18, wherein the conductivity or resistivity is presented as an image of the borehole.

20. The apparatus as in claim 12, wherein the artificial neural network comprises an input layer, a hidden layer, and an output layer, the hidden layer comprising at least sixteen neurons.

21. The apparatus as in claim 12, where in the carrier comprises a wireline, a slickline, a drill string or coiled tubing.

22. A non-transitory computer readable medium comprising computer executable instructions for estimating a property of an earth formation penetrated by a borehole by implementing a method comprising:

performing a plurality of electrical measurements on the formation using a sensor disposed at the carrier and having a plurality of electrodes disposed in a concentric arrangement wherein a standoff distance between the sensor and a wall of the borehole has an influence on each electrical measurement in the plurality of electrical measurements;

determining an impedance for each electrical measurement in the plurality of electrical measurements;

inputting each determined impedance into an artificial neural network implemented by a processor; and outputting the property from the artificial neural network wherein the outputted property compensates for the influence of sensor standoff distance on each electrical measurement in the plurality of electrical measurements.

23. The method as in claim 1, wherein the artificial neural network comprises a non-linear activation function that is a Tan-Sigmoid transfer function.

* * * * *